US007856476B2

United States Patent
Halahmi et al.

(10) Patent No.: US 7,856,476 B2
(45) Date of Patent: Dec. 21, 2010

(54) E-MAIL PROXY

(75) Inventors: Erez Halahmi, Petach Tikva (IL); Eran Fuchs, Kfar Saba (IL)

(73) Assignee: TIP Communications, LLC, Irving, TX (US)

( * ) Notice: Subject to any disclaimer, the term of this patent is extended or adjusted under 35 U.S.C. 154(b) by 943 days.

(21) Appl. No.: 10/368,011

(22) Filed: Feb. 19, 2003

(65) Prior Publication Data
US 2004/0024826 A1    Feb. 5, 2004

Related U.S. Application Data

(63) Continuation-in-part of application No. 09/657,001, filed on Sep. 7, 2000, now Pat. No. 7,039,678, and a continuation-in-part of application No. PCT/IL01/00804, filed on Aug. 28, 2001.

(51) Int. Cl.
G06F 15/16    (2006.01)
H04L 12/58    (2006.01)

(52) U.S. Cl. .................................. 709/206; 709/207

(58) Field of Classification Search ............... 709/225, 709/226, 227, 232, 238, 206, 207, 217, 203; 455/412.1
See application file for complete search history.

(56) References Cited

U.S. PATENT DOCUMENTS

| | | | | |
|---|---|---|---|---|
| 5,781,901 A * | 7/1998 | Kuzma | ........... | 1/1 |
| 5,903,723 A * | 5/1999 | Beck et al. | ........... | 709/200 |
| 6,157,924 A * | 12/2000 | Austin | ........... | 707/10 |
| 6,256,666 B1 * | 7/2001 | Singhal | ........... | 709/217 |
| 6,275,848 B1 * | 8/2001 | Arnold | ........... | 709/206 |
| 6,275,850 B1 * | 8/2001 | Beyda et al. | ........... | 709/206 |
| 6,363,415 B1 * | 3/2002 | Finney et al. | ........... | 709/206 |
| 6,687,741 B1 * | 2/2004 | Ramaley et al. | ........... | 709/206 |
| 6,701,315 B1 * | 3/2004 | Austin | ........... | 707/10 |
| 6,717,957 B1 * | 4/2004 | Quine | ........... | 370/487 |
| 6,785,732 B1 * | 8/2004 | Bates et al. | ........... | 709/232 |
| 6,839,741 B1 * | 1/2005 | Tsai | ........... | 709/217 |
| 6,882,793 B1 * | 4/2005 | Fu et al. | ........... | 386/95 |

(Continued)

FOREIGN PATENT DOCUMENTS

WO    WO 99/14909 A1    3/1999

OTHER PUBLICATIONS

A framework for adaptive content delivery in heterogeneous network environments—XP-002374871 -Wei-Ying Ma, Iija Bedner, Grace Chang, Allan Kuchinsky, and Hongjiang Zhang—Hewlett Packard Las CA 94304-1126—Jan. 2000.

(Continued)

*Primary Examiner*—Ario Etienne
*Assistant Examiner*—Sargon N Nano
(74) *Attorney, Agent, or Firm*—Jordan Powell; Ray Jenski

(57) ABSTRACT

A system and method for providing e-mail messages to a user in a more efficient manner. Specifically, the system and method of the present invention enable attachments to be downloaded separately from the text-part of the e-mail message, which requires less bandwidth to download. Instead, these attachments are represented by links in the message which is downloaded to the e-mail client of the user, such that the user can "click on" or otherwise select a link in order to retrieve the attachment. Preferably, the attachment is downloaded to the computational device of the user in a streamed manner.

16 Claims, 7 Drawing Sheets

U.S. PATENT DOCUMENTS

| | | | |
|---|---|---|---|
| 6,915,332 B1* | 7/2005 | Zdepski | 709/206 |
| 7,054,905 B1* | 5/2006 | Hanna et al. | 709/206 |
| 7,159,039 B1* | 1/2007 | Hahn et al. | 709/246 |
| 2002/0010746 A1* | 1/2002 | Jilk et al. | 709/206 |
| 2002/0016818 A1* | 2/2002 | Kirani et al. | 709/203 |
| 2002/0049817 A1* | 4/2002 | Drory et al. | 709/206 |
| 2002/0188689 A1* | 12/2002 | Michael | 709/206 |
| 2003/0028647 A1* | 2/2003 | Grosu | 709/227 |
| 2006/0218287 A1* | 9/2006 | Dodrill et al. | 709/227 |

OTHER PUBLICATIONS

Transcoding Internet Content for Heterogeneous Client Devices—John R. Smith, Rakesh Mohan, and Chung-Sheng Li—IBM T.J. Watson Research Center—1998 IEEE.

* cited by examiner

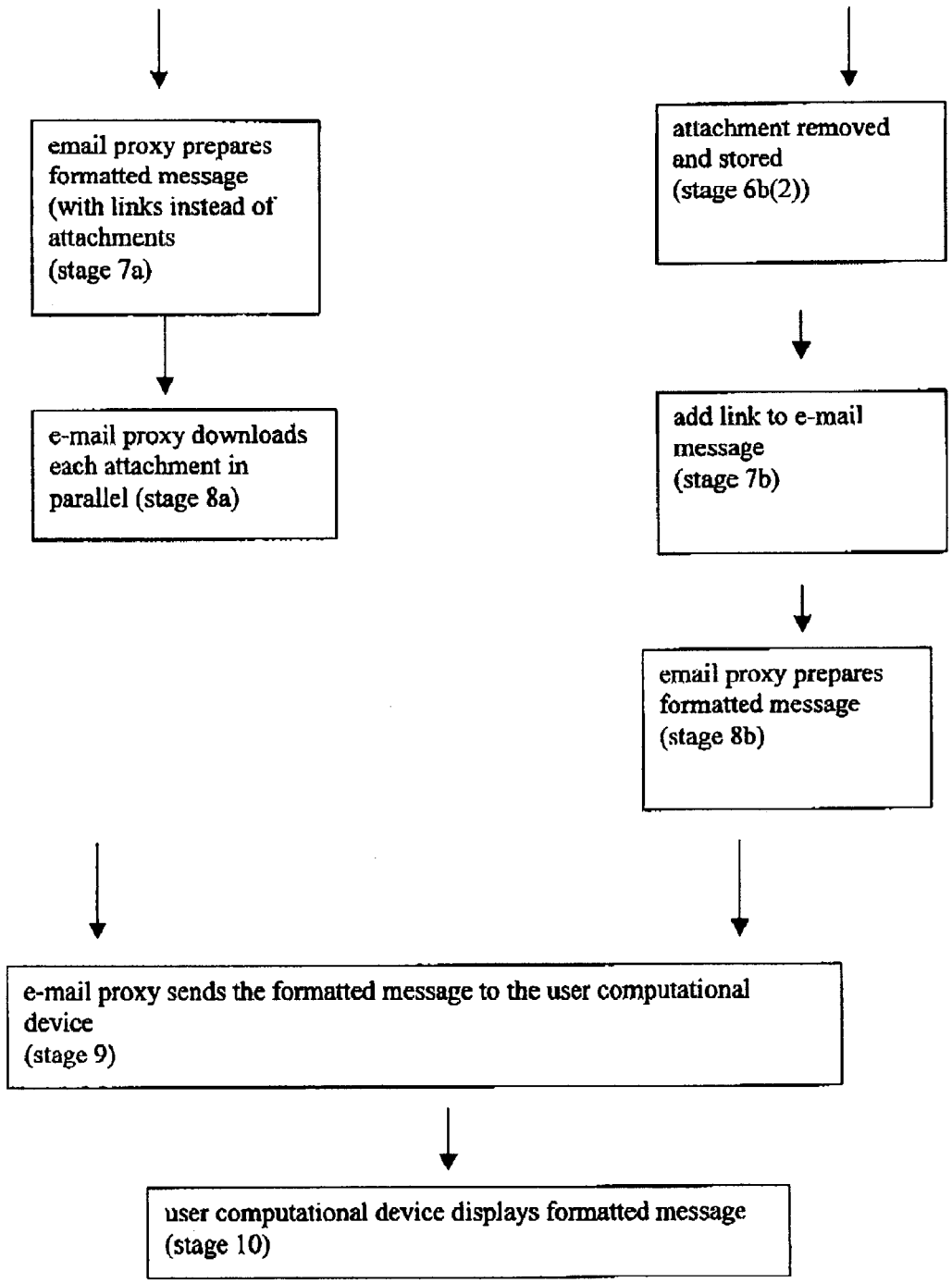
Figure 2 (con't1)

Figure 2 (con't 2)
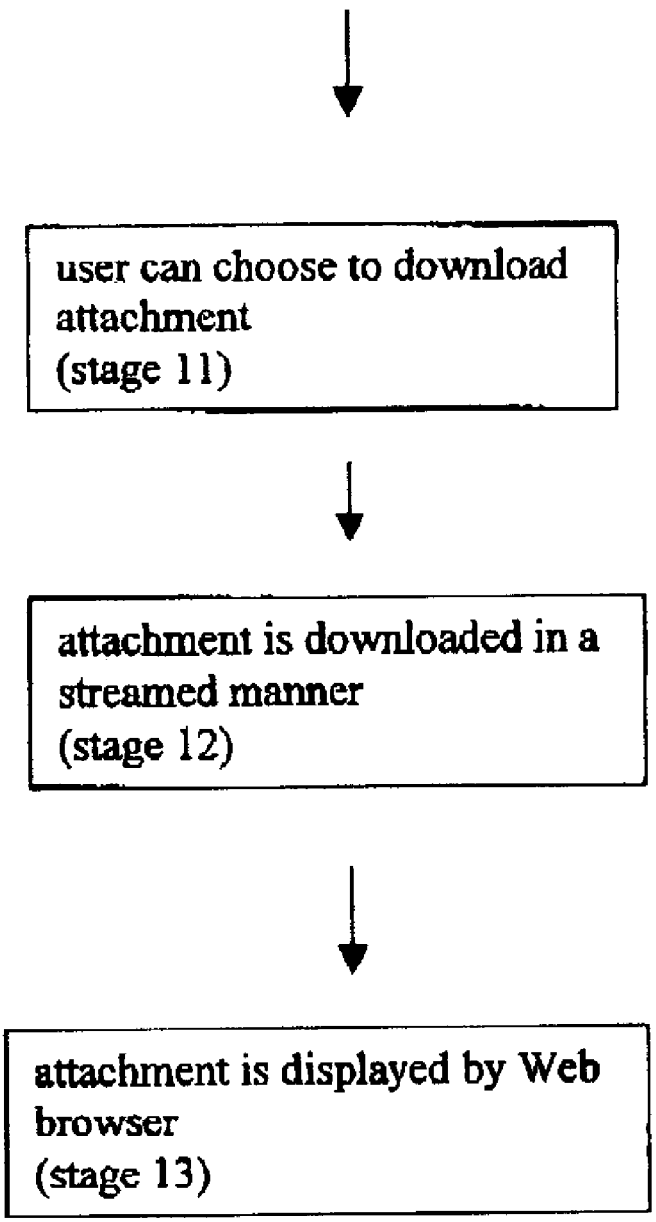

Figure 4 (con't)
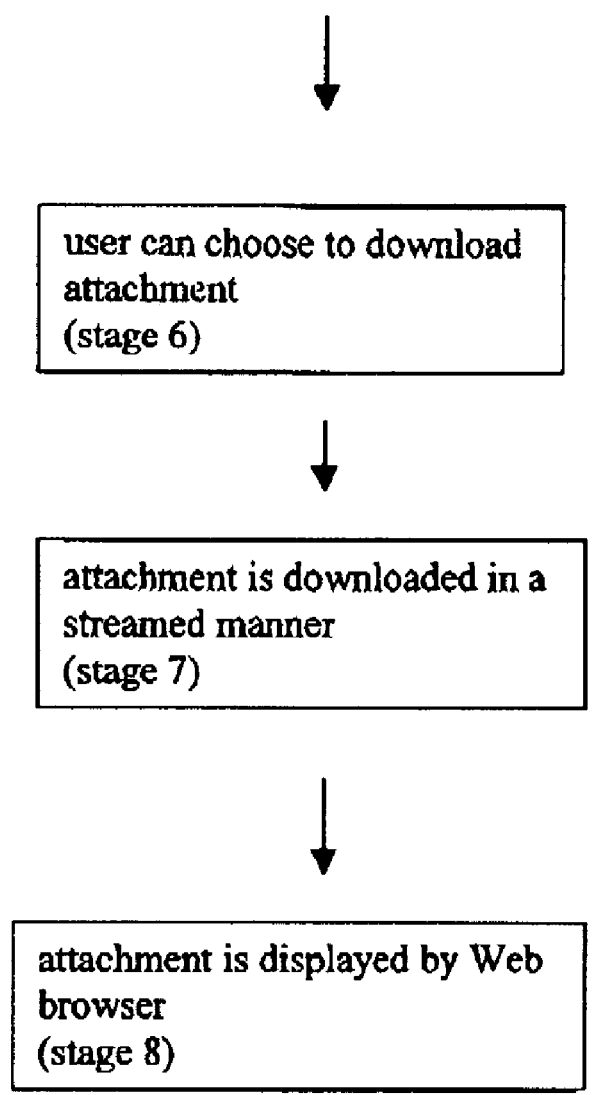

US 7,856,476 B2

E-MAIL PROXY

This application is a Continuation-in-Part Application of U.S. patent application Ser. No. 09/657,001, filed on Sep. 7, 2000, now U.S. Pat. No. 7,039,678, and of PCT Application No. PCT/IL01/00804, filed on Aug. 28, 2001, both of which are currently and both of which are hereby incorporated by reference as if fully set forth herein.

FIELD OF THE ENTION

The present invention is of a system and a method, for enabling e-mail (electronic mail) messages to be received more quickly and efficiently by the user.

BACKGROUND OF THE INVENTION

Currently, most computer users hereinafter also referred to as "hers") receive e-mail messages through a connection between a computer and an e-mail server. The e-mail server holds the received e-mail messages for the user, and may be installed at an ISP (Internet Service Provider), for example. Such servers usually operate according to the POP3 (Post Office Protocol 3) protocol or alternatively according to the IMAP4 (Internet Message Access Protocol, version 4) protocol. The computer of the user must operate an e-mail client, which is a software program for communicating with the e-mail server in order to download the e-mail messages, and then for displaying these e-mail messages to the user. The e-mail client communicates with the e-mail server according to the POP3 or IMAP4 protocol for receiving e-mail messages, and SMTP (Simple Message Transfer Protocol) for sending (or forwarding) e-mail messages.

The e-mail messages are typically encoded in the standard MIME multi-part message format, which enables the message to optionally also include one or more attachments, for example. Each part of the multi-part message may be separately and differently encoded, for example for plain text messages, as opposed to attached word processing documents, image files, video data, audio data and so forth. Such a multi-part message may be very large because of the size of the attachment(s).

Unfortunately, the e-mail client currently downloads the entire multi-part e-mail message when connected to the e-mail server for receiving messages. Since such a multi-part message may be very large, the process of downloading each message may require a significant period of time. Furthermore, the user cannot view each message with attachment(s) if any, until the entire message has been downloaded. If the computer of the user is connected to the e-mail server through a relatively slow, low bandwidth connection, such as a dial-up modem for example, then this process can be frustratingly slow.

The process is further slowed by the requirement for encoding the attachments in BASE64, in order to prevent the exposure of any control characters in the attachments to any servers which pass the e-mail message through the Internet. The BASE64 encoding method represents every 24 bits of the attachment with 32 bits, thereby increasing the size of the encoded attachments by about one third. Thus, the currently available mechanism for downloading e-mail messages clearly has a number of drawbacks.

An improved solution to this problem would enable the user to review e-mail messages before downloading them, or at least before downloading the complete multi-part message with attachment(s), as text-only e-mail messages are relatively small and quick to download. The user would still be able to download attachments of interest. In addition, the improved solution would provide for a streaming process for downloading e-mail attachments, in order for the user to be able to view the e-mail message as it is being downloaded. Unfortunately, such a solution is not currently available.

SUMMARY OF THE INVENTION

The background art does not teach or suggest the use of a system and method for more efficiently transmitting attachments, such that user can optionally select particular attachments to download and such that the attachments can be downloaded separately. The background art also does not teach or suggest the implementation of such a system and method with an e-mail proxy that is separate from an e-mail server, nor does the background art teach or suggest such an implementation with the functionality embedded with the e-mail server. The background art also does not teach or suggest a system and method which would also optionally and preferably enable the e-mail attachments to be downloaded in a streamed manner, for increased speed and efficiency of downloading.

The present invention overcomes these disadvantage of the background art by providing a system and method for providing e-mail messages to a user in a more efficient manner. Specifically, the system and method of the present invention enable attachments to be downloaded separately from the body of the e-mail message, which is typically text-only and which therefore requires less bandwidth to download. Instead, these attachments are represented by links in the message which is downloaded to the e-mail client of the user, such of the user can "click on" or otherwise select a link in order to retrieve the attachment Preferably, the attachment is downloaded to the computational device of the user in a streamed manner, for example according to the HTTP (HyperText Transfer Protocol) protocol.

The present invention may optionally operate with an e-mail proxy, which would optionally and more preferably be implemented as a separate server from the e-mail server. Alternatively; the present invention may operate in combination with the e-mail server, for example optionally by implementing the present invention as a software module for being operated by the e-mail server. Alternatively, the functionality of the present invention could optionally be integrated within he functions of the e-mail server, for example by integrating software. Other implementations of the present invention are also possible and are also considered to be within the scope of the present invention.

According to preferred embodiments of the present invention, the attachment is preferably transmitted with a streaming transmission that has already been decoded. The text is preferably transmitted separately.

According to the present invention, there is provided a method for selectively downloading a multi-part e-mail message to an e-mail client operated by a user from an e-mail server, the multi-part e-mail message including an attachment, the method comprising the stages of (a) retrieving at least attachment information for the multi-part e-mail message from the e-mail server; (b) preparing a formatted message for sending to the c-mail client, the formatted message containing at least a link to the attachment, such that the attachment is lot sent to the c-mail client; (c) sending the formatted message to the e-mail client; and (d) displaying the formatted message to the user by the e-mail client According to another embodiment of the present invention, there is provided a system for selectively downloading a multi-part e-mail message for a user, the multi-part e-mail message including an attachment, the system comprising: (a) an e-mail server for receiving tee multi-part e-mail message; (b) an e-mail proxy in communication with the e-mail server for receiving at least attachment information about the multi-part e-mail message, and for preparing a formatted message containing a link to the attachment; and (c) an e-mail client in communication with the e-mail proxy for receiving the formatted message and for displaying the formatted message to the user, such that the attachment is displayed to the user after the user selects the link.

Hereinafter, th term "network" refers to a connection between any two or more computational devices which permits the transmission of data.

Hereinafter, the term "computational device" includes, but is not limited to, personal computers (PC) having an operating system such as Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to; laptops, hand-held computers, PDA (personal data assistant) deices, cellular telephones, any type of WAP (wireless application protocol) enabled device, wearable computers of any sort; and any device which can be connected to a network as previously defined and which has an operating system. Hereinafter, the ten "Windows™" includes but is not limited to Windows95™, Windows NT™, Windows98™, Windows CE™, Windows2000™, and any upgraded versions of these operating systems by Microsoft Corp. (USA). It is understood that the term "computer", as used herein, may refer to substantially any computational device.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functional stages performed by the method could be described as a plurality of instructions performed by a data processor.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method for providing e-mail messages to a user in a more efficient manner. Specifically, the system and method of the present invention enable attachments, if present, to be downloaded separately from the e-mail message, which may be text only and which therefore requires less time to download. In any case, preferably only the text-part of the e-mail message is downloaded for multi-part messages, for greater efficiency of downloading. Rather than being downloaded directly with the remainder of the message, these attachments are optionally and preferably represented by links in the message which is downloaded to the e-mail client of the user, such that the user can "click on" or otherwise select a link in order to retrieve the attachment.

According to a further preferred embodiment of the present invention, the attachment is downloaded to the computational device of the user in a streamed manner. For example, the attachment could be downloaded according to the HTTP protocol, and then displayed by a Web browser or other suitable display software which is operated by the computational device of the user. Of course, other types of streaming protocols could optionally be used for downloading the file, along with any suitable display mechanism provided by the computational device. This has the advantage of enabling the user to view the attachment as it is being downloaded, rather than being required to wait for the entire attachment to be downloaded before viewing any part of it Optionally, the attachment could also be downloaded to the e-mail proxy in the background, as a separate procedure from the downloading of the text-part, or even "on the fly" according to the request of the user, depending upon the e-mail protocol which is used.

The principles and operation of the present invention may be better understood with reference to the drawings and the accompanying description. The present invention is operative with any e-mail protocol, including but not limited to, IMAP4 and POP3 protocols for receiving e-mail messages The POP3 protocol is explained in RFC1725, while the IMAP4 protocol is explained in RFC2060, both from the Network Working Group, although of course the scope of the present invention is not limited to operation with these protocols.

Figure 1:
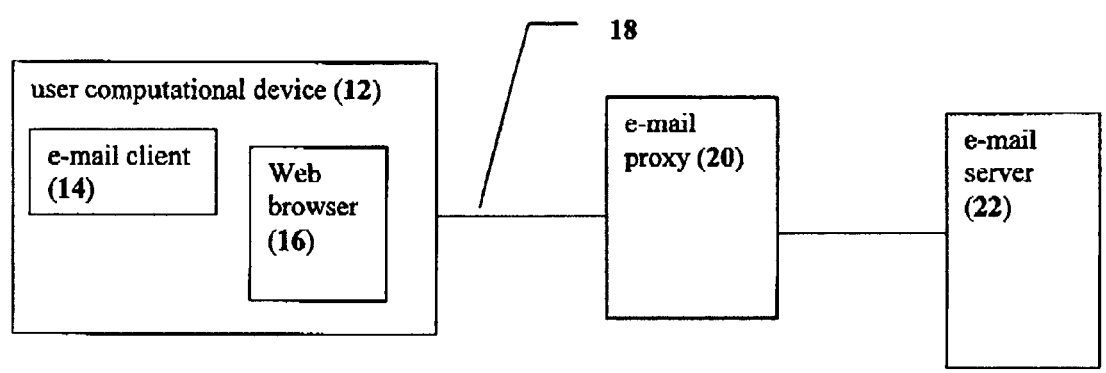
FIG. 1 is a schematic block diagram of an exemplary system according to the present invention.

Referring now to the drawings, FIG. 1 is a schematic block diagram of a system according to the present invention for more rapidly and efficiently retrieving e-mail messages, particularly multi-part messages. A system 10 features a user computational device 12 which operates an e-mail client 14, and optionally also operates a Web browser 16. E-mail client 14 can optionally be implemented as any type of software program and/or other type of functionality which is able to communicate according to standard c-mail messaging protocols, such as POP3 and IMAP4 for example. A non-limiting example of such a software program is the Outlook™ program (Microsoft Corp., USA). The user is able to interact with e-mail client 14 and optionally with Web browser 16. User computational device 12 is connected to a network 18, such as the Internet for example, through which user computational device 12 is in communication with an e-nail proxy 20. E-mail proxy 20, in turn, is in communication with an e-mail server 22.

When the user wishes to retrieve one or more e-mail messages, the user activates e-mail client 14. According to the background art, e-mail client 14 would communicate directly with e-mail server 22. However, according to the present invention, e-mail proxy 20 first communicates with c-mail server 22, in order to retrieve one or more e-mail messages for the user, either in their entirety or as a portion thereof. E-mail proxy 20 then processes these messages. If an attachment is present, e-mail proxy 20 preferably processes the message by removing any attachment(s) and storing them if the entirety of the message is downloaded. Alternatively, if only a portion of the message is retrieved, for example for a multi-part message, preferably the text-part is retrieved, and e-mail proxy 20 then downloads the attachment(s), if present, in the background for storage.

E-mail proxy 20 then preferably substitutes a link to the storage location of the attachment in the e-mail message, and passes this modified e-mail message to e-mail client 14 at user computational device 12. The modified e-mail message is much smaller, and so can be downloaded much more quickly by user computational device 12.

The user may optionally decide to view one of the attachment(s), if the message has an attachment, at which point the user preferably "clicks on" or otherwise selects the appropriate link in the e-mail message through c-mail client 14. User computational device 12 then downloads the attachment from e-mail proxy 20. More preferably, the attachment is downloaded to user computational device 12 in a streamed manner, such that the user is able to start viewing each portion of the attachment as it arrives at user computational device 12. Optionally, such streamed downloading is achieved by activating Web browser 16, such that the attachment is then downloaded according to the HTTP protocol, and is displayed to the user through Web browser 16. In any case, in order to increase the speed and efficiency of downloading the attachment, the attachment is most preferably decoded, for example from BASE64 encoding, before being downloaded.

Figure 2:
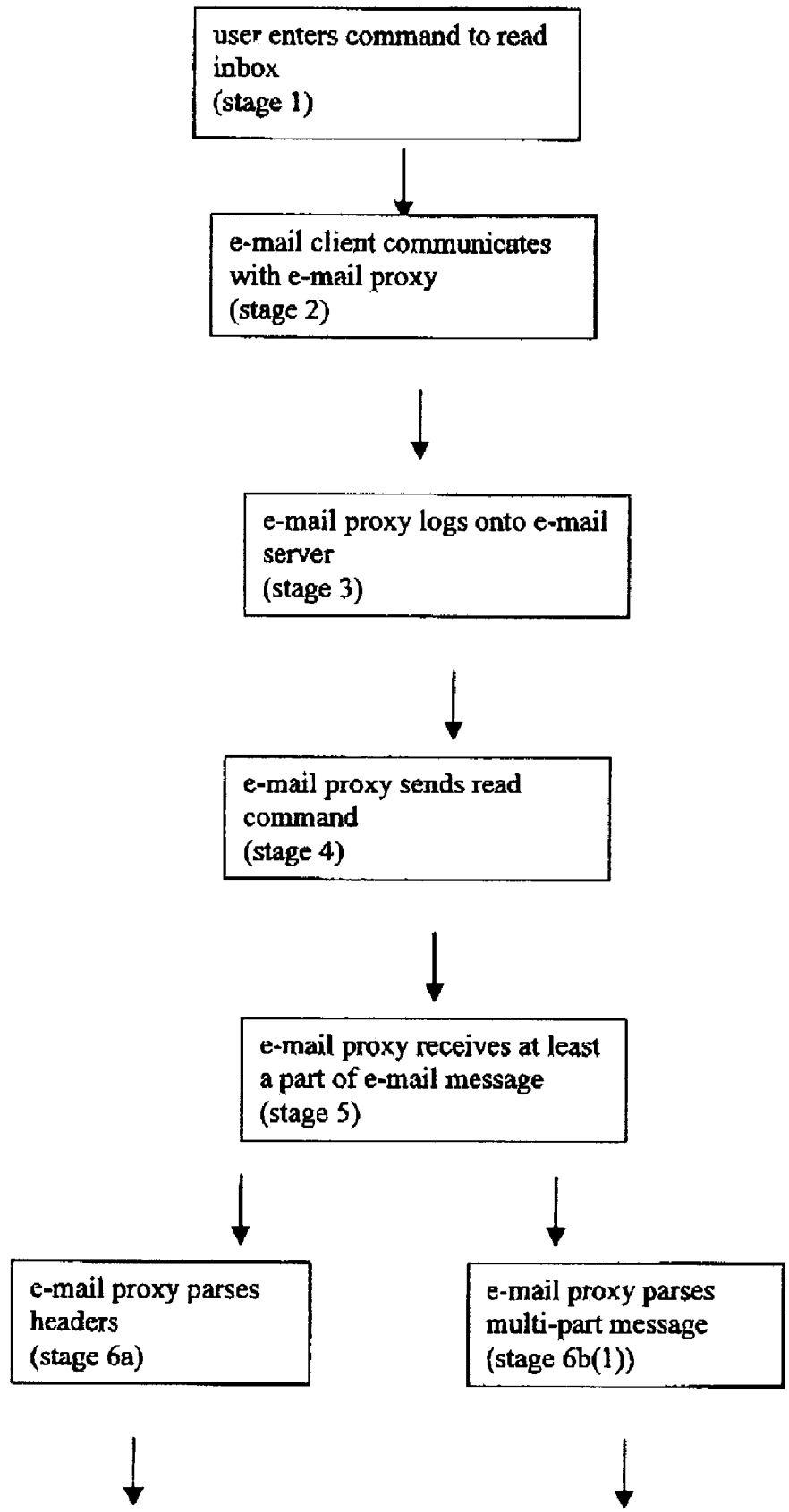
FIG. 2 is a flowchart of an exemplary method according to the present invention.

FIG. 2 is a flowchart of an exemplary method according to the present invention for retrieving an e-mail message, particularly a multi-part e-mail message. It should be noted that for the description below, the e-mail messages are assumed to be multi-part messages, for the purposes of explanation only and without any intention of being limiting.

In stage 1, the user enters a command to the e-mail client which is operated by the computational device of the user, in order to read the e-mail "inbox" of the user. According to the background art, in stage 2, the e-mail client would communicate with a background e-mail server, for example at an ISP though a dial-up modem connection.

According to the present invention, however, in stage 2, the e-mail client communicates with an e-mail proxy, described with regard to FIG. 1 above. The e-mail proxy of the present invention communicates with the background art e-mail server in order to receive at least a portion of the multi-part e-mail messages. As explained in greater detail below, according to the POP3 protocol, the complete multi-part e-mail messages, with attachments (if any), are downloaded. Alternatively, according to the IMAP4 protocol, optionally only the header information for the attachments is downloaded, while the attachments themselves are downloaded at a later point (for example, in the background). The first part of this process occurs in stage 3, when the e-mail proxy "logs into", or gains access permission for, the inbox of the user on the e-mail server. According to the POP3 protocol, the process of "logging in" involves the establishment of a TCP connection between the e-mail proxy and the e-mail server, through a handshake procedure (see for example RFC1725 from the Network Working Group for a description of this protocol). Once the connection has been established, the e-mail server sends a greeting to the e-mail proxy, after which commands may be exchanged for retrieving e-mail messages. These commands typically include sending information from the e-mail proxy to the e-mail server for the purposes of authorization, such as a user name for identifying the inbox and a password, as well as transaction commands for actually receiving the e-mail message(s).

The remainder of the method is explained separately with regard to the POP3 protocol and the IMAP4 protocol. IMAP4 has the advantage of supporting commands such as "SEARCH", which enable the e-mail server to return only e-mail messages of interest, such that the e-mail proxy does not need to parse the headers of the e-mail messages in order to determine which e-mail message(s) are of interest. IMAP4 also supports the ability to retrieve only part of the e-mail message directly, with the "FETCH" command. A complex request for part of an attachment can also be sent with the "FETCH" command.

In stage 4, if stage 3 is successful, the e-mail proxy sends at least one command to the e-mail server to read the inbox of the user. First, the e-mail proxy could send the "STAT" command to determine the total number of message and the total size of these messages. The e-mail proxy then sends the "LIST" command to the e-mail server in order to receive a list of e-mail messages. The received list includes the message identification numbers. The e-mail proxy then downloads the complete multi-part message for the POP3 protocol, but alternatively downloads only the header or headers for the e-mail message(s) by using the "fetch" command for the IMAP4 protocol More preferably, for the IMAP4 protocol, all of the headers of all of the message-parts for all of the messages are retrieved, such that complete information about all of the messages is obtained, but not the message content.

Stage 4, or any part thereof as required, is preferably repeated as necessary such that in stage 5, the e-mail proxy receives at least one, but preferably all of the attachments for the e-mail messages which are in the inbox.

Alternatively, the e-mail proxy could download the entirety of each e-mail message, with attachments if any, by sending the "RETR" command to the e-nail server, thereby combining stages 4 and 5 into a single stage if all of the e-mail messages are to be retrieved at once, as according to the POP3 protocol.

Regardless of which type of downloading method is preferred, the e-mail proxy preferably provides some type of identification information, in order for the user to be able to determine which e-mail messages are of interest, for example in order to download the attachment(s) of the e-mail message, if any. The method now splits to two branches. For the left branch, which is performed according to the IMAP4 protocol, the attachment information preferably only features certain header information, while the attachment itself is optionally retrieved separately. For the right branch, which is performed according to the POP3 protocol, the entirety of the multi-part e-mail message is retrieved, with the attachment. In either case, more preferably the user is presented with at least a portion of the actual text e-mail message, which is not an attachment As shown in the left branch, in stage 6a, the e-mail proxy optionally and preferably parses the headers of the message, more preferably according to at least one user preference. For example, the user could request to see only the identity of the sender and the subject of the e-mail message. As described with regard to RFC822 and RFC2045 (Network Working Group), the e-mail message has a predefined structure, such that a multi-part message has a main header, followed by the body. The body itself may have a plurality of headers and bodies for each part of the multi-part message, for example for the text-part, as well as for each attachment. The main header includes fields, which are indicated according to a predefined lexical structure.

In stage 7a, the e-mail proxy optionally and preferably prepares a formatted message containing the information of interest to be sent to the user computational device for display to the user. In particular, the formatted message preferably contains the text-part, as well as a link to each attachment which is added to the message in the place of each attachment. This stage is preferably repeated until all attachments have been replaced by links in the formatted message.

In parallel, in stage 8a the e-mail proxy optionally and more preferably starts to download each attachment from the e-mail server, most preferably as a background process. Alternatively, the process of downloading each attachment may be performed "on the fly" upon receiving a request from the user, as described in greater detail below. Once the attachment has been received, it is preferably decoded, as described in greater detail below.

Turning now to the right branch, which is performed according to the POP3 protocol, the e-mail proxy receives the entirety of the multi-part e-mail message, including all attachments. In stage 6b(1), the e-mail proxy parses the multi-part message to determine the boundaries of each portion In stage 6b(2), when an attachment is found, the header and body of each attachment is removed from the multi-part message, and the attachment itself is stored at a particular location on the e-mail proxy. More preferably, this stage also includes the stage of decoding each attachment, for example from BASE64 coding.

The actual method applied for decoding the attachment data depends upon the type of encoding method which was used, as described in RFC2045 For example, BASE64 Content-Transfer-Encoding transforms 24-bit groups of input bits into strings of four encoded characters as the output, according to a table given in RFC2045. Decoding reverses the procedure, and takes every four encoded characters for transformation back to the original data according to the correspondence which is given in the table. After decoding, the data is in the original content type, such as text for example.

In stage 7b, a short one-link to the storage location on the e-mail proxy is added to the multi-part message, in place of the attachment. Stages 6b(2) and 7b are preferably repeated as necessary in order to replace all such attachments. In stage 8b, the formatted message is prepared from the text-only portion of the e-mail message and the links to the location for storing each attachment, which in this case has already been received and stored by the e-mail proxy.

In stage 9, the e-mail proxy sends the formatted message to the user computational device, preferably including the text-part of the message with link(s) to any attachment(s).

Optionally and more preferably, the e-mail proxy sends the formatted message to the user computational device in a streamed manner. By "streaming" it is meant that the formatted message is sent without encoding, such that the user computational device can immediately begin to display the formatted message as soon as any portion of it is received. If streaming is used to send the formatted message, then the formatted message is more preferably transmitted according to HTTP (HyperText Transfer Protocol) commands, such that the formatted message is optionally prepared as an HTML (HyperText Mark-up Language) document for example.

In stage 10, the user computational device displays the formatted message, after which the user is able to determine which additional information is to be retrieved from the e-mail proxy. If the formatted message contains one or more links to an attachment, then in stage 11, the user can choose to download an attachment by "clicking on" the link with a mouse or other pointing device, or otherwise selecting the link.

In stage 12, the attachment is preferably downloaded in a streamed manner, optionally and more preferably by activating a Web browser. The Web browser can then download the attachment through HTTP (HyperText Transfer Protocol) streaming. Downloading the attachment in a streamed manner allows the user to view the attachment through the Web browser as the attachment is being downloaded, in stage 13.

Such a streamed manner is particularly useful for large media files which are designed to be played to the user in a streamed manner, such as video and audio files. Furthermore, the amount of time which is required to download these files is also reduced by first decoding the files, such that the BASE64 encoding is removed from the data, as such encoding tends to add a third of the size of the data, as previously noted.

Figure 3:
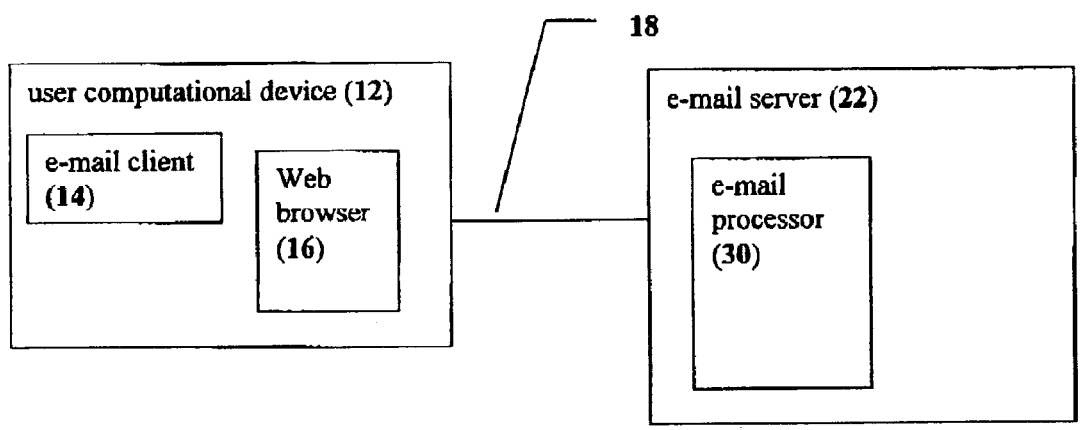
FIG. 3 is a schematic block diagram of another exemplary system according to the present invention.

FIG. 3 shows another exemplary embodiment of the present invention, in which the functionality of the e-mail proxy of FIG. 1 is preferably located at the e-mail server itself. The components of the system are otherwise similar to those of FIG. 1.

An e-mail processor 30 is now preferably located at e-mail server 22. E-mail processor 30 preferably performs those functions required for processing multi-part e-mail messages, particularly those messages which contain attachments, for more efficient transmission to e-mail client 14 at user computational device 12. As for FIG. 1, when the user wishes to retrieve one or more e-mail messages, the user activates e-mail client 14, which communicates directly with e-mail server 22. E-mail server 22 then preferably retrieves one or more e-mail messages for the user, either in their entirety or as a portion thereof. E-mail server 22 may then optionally and preferably break the messages into portions, more preferably for multi-part messages. For example, e-mail server 22 may optionally and preferably store an attachment separately from a text-part of the message. E-mail server 22 then optionally and preferably constructs an e-mail message to be sent to the user (or more preferably, to be retrieved by the user). This constructed e-mail message preferably contains a portion of the original e-mail message, and more preferably contains only a portion of the original e-mail message, most preferably the text-part.

For this preferred embodiment, e-mail processor 30 then preferably inserts a link to the attachment in the constituted e-mail message, providing the location in which the attachment is stored with regard to e-mail server 22.

Alternatively, e-mail processor 30 then processes these messages, preferably by removing any attachments and storing them if the entirety of the multi-part message is downloaded. Alternatively, if only a portion of the multi-part message is retrieved, preferably the text-part, e-mail processor 30 then preferably causes the attachments to be downloaded in the background for storage. E-mail processor 30 optionally and preferably processes the attachment with the attachment information, or alternatively processes the attachment separately from the attachment information. E-mail processor 30 then also preferably substitutes a link to the storage location of the attachment in the e-mail message.

E-mail server 22 preferably passes this modified e-mail message to e-mail client 14 at user computational device 12. The modified e-mail message is much smaller, and so can be downloaded much more quickly by user computational device 12.

The user may optionally decide to view one of the attachments, at which point the user preferably "clicks on" or otherwise selects the appropriate link in the e-mail message through e-mail client 14 User computational device 12 then downloads the attachment from e-mail server 22. More preferably, the attachment is downloaded to user computational device 12 in a streamed manner, such that the user is able to start viewing each portion of the attachment as it arrives at user computational device 12. Optionally, such streamed downloading is achieved by activating Web browser 16, such that the attachment is then downloaded according to the HTTP protocol, and is displayed to the user through Web browser 16. In any case, in order to increase the speed and efficiency of downloading the attachment, the attachment is most preferably decoded, for example from BASE64 encoding, before being downloaded.

With regard to the method described in FIG. 2, a similar method may optionally be performed with the system of FIG. 3, but with some alterations (the exemplary method is described with regard to FIG. 4 below). For example, the earlier stages (1-6) of FIG. 2, which are concerned with having the e-mail proxy "log in" to the e-mail server, are preferably not performed. Instead, the e-mail processor is preferably located at the e-mail server and is actually preferably embedded within the server. Otherwise, as described below, many of the processing functions of the e-mail proxy are preferably performed by the e-mail processor.

Figure 4:
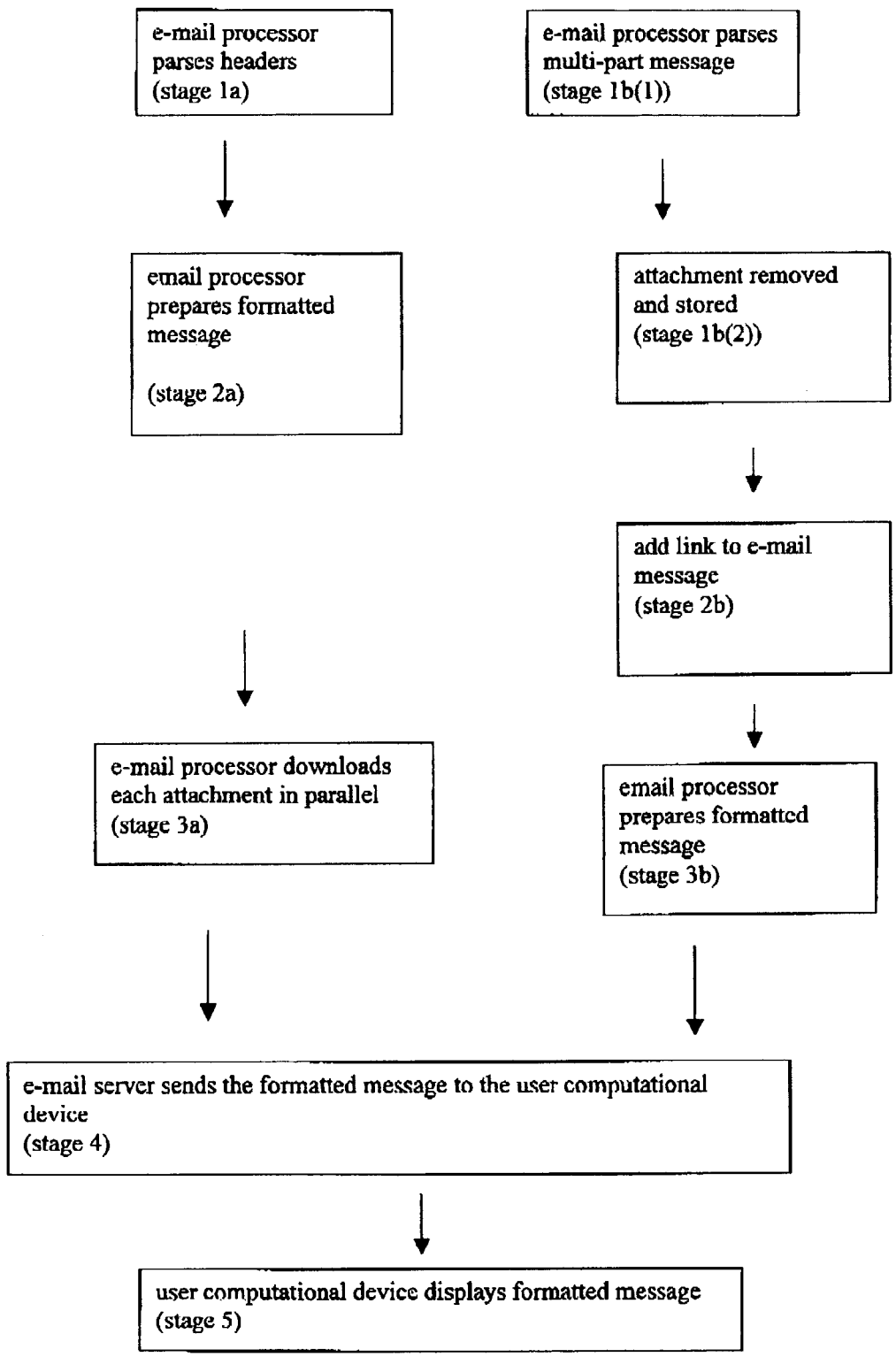
FIG. 4 is a flowchart of another exemplary method according to the present invention.

As shown with regard to FIG. 4, which shows a flowchart of an exemplary method for operating the system of FIG. 3, the method may optionally be performed according to one of two branches. It should be noted that the e-mail messages are assumed to be multi-part messages, for the purposes of explanation only and without any intention of being limiting. For the left branch, which is performed according to the IMAP4 protocol, the attachment information preferably only features certain header information, while the attachment itself is optionally retrieved separately. For the right branch, which is performed according to the POP3 protocol, the entirety of the multi-part e-mail message is retrieved, with the attachment. In either case, more preferably the user is presented with at least a portion of the actual text e-mail message, which is not an attachment.

As shown in the left branch, in stage 1a, the e-mail processor optionally and preferably parses the headers of the message, more preferably according to at least one user preference Alternatively, such parsing could optionally be performed by the e-mail server itself For example, the user could request to see only the identity of the sender and the subject of the e-mail message. As described with regard to RFC822 and RFC2045 (Network Working Group), the e-mail message has a Predefined structure, such that a multi-part message has a main header, followed by the body. The body itself may have a plurality of headers and bodies for each Part of the multi-part message, for example for the text-part, as well as for each attachment. The main header includes fields, which are indicated according to a predefined lexical structure.

In stage 2a, the e-mail processor optionally and preferably prepares a formatted message containing the information of interest to be sent to the user computational device for display to the user. Alternatively, such a formatted message could optionally be constructed by the e-mail server itself. In particular, the formatted message preferably contains the text-part, as well as a link to each attachment which is added to the message in the place of each attachment. This stage is preferably repeated until all attachments have been replaced by links in the formatted message.

In parallel, in stage 3a, the e-mail processor optionally and more preferably decodes each attachment from the e-mail server, as described in greater detail below. Alternatively, the e-mail server may performing the decoding process.

Turning now to the right branch, which is performed according to the POP3 protocol, the e-mail server receives the entirety of the multi-part e-mail message, including all attachments, if any are present. In stage 1b(1), the e-mail processor (or alternatively, the e-mail server) parses the multi-part message to determine the boundaries of each portion. In stage 1b(2), when an attachment is found, the header and body of each attachment is removed from the multi-part message, and the attachment itself is stored at a particular location. More preferably, this stage also includes the stage of decoding each attachment, for example from BASE64 coding.

The actual method applied for decoding the attachment data depends upon the type of encoding method which was used, as described in RFC2045. For example, BASE64 content-Transfer-Encoding transforms 24-bit groups of input bits into strings of four encoded characters as the output, according to a table given in RFC2045. Decoding reverses the procedure, and takes every four encoded characters for transformation back to the original data according to the correspondence which is given in the table. After decoding, the data is in the original content type, such as text for example.

In stage 2b, a short one-link to the storage location, optionally on the e-mail server is added to the multi-part message, in place of the attachment. Preferably, the e-mail processor adds the link to the formatted message. Stages 1b(2) and 2b are preferably repeated as necessary in order to replace all such attachments. In stage 3b, the formatted message is preferably prepared from the text-only portion of the e-mail message and the links to the location for storing each attachment In stage 4, the e-mail server sends the formatted message to the user computational device, preferably including the text-part of the message with link(s) to any attachment(s), if any are present.

Optionally and more preferably, the e-mail server sends the formatted message to the user computational device in a streamed manner. By "streaming" it is meant that the formatted message is sent without encoding, such that the user computational device can immediately begin to display the formatted message as soon as any portion of it is received. If streaming is used to send the formatted message, then the formatted message is more preferably transmitted according to HTTP (HyperText Transfer Protocol) commands, such that the formatted message is optionally prepared as an HTML (HyperText Mark-up Language) document for example.

In stage 5, the user computational device displays the formatted message, after which the user is able to determine which additional information is to be retrieved from the e-mail processor. If the formatted message contains one or more links to an attachment, then in stage 6, the user can choose to download an attachment by "clicking on" the link with a mouse or other pointing device, or otherwise selecting the link.

In stage 7, the attachment is preferably downloaded in a streamed manner, optionally and more preferably by activating a Web browser, although alternatively according to any suitable protocol for streaming downloads. The Web browser can then download the attachment through HTTP (HyperText Transfer Protocol) streaming. Downloading the attachment in a streamed manner allows the user to view the attachment through the Web browser as the attachment is being downloaded, in stage 8. Such a streamed manner is particularly useful for large media files which are designed to be played to the user in a streamed manner, such as video and audio files. Furthermore, the amount of time which is required to download these files is also reduced by first decoding the files, such that the BASE64 encoding is removed from the data, as such encoding tends to add a third of the size of the data, as previously noted.

While the invention has been described with respect to a limited number of embodiments, it will be appreciated that many variations, modifications and other applications of the invention may be made.

What is claimed is:

1. A method for selectively downloading a multi-part e-mail message at an e-mail processor to an e-mail client operated by a recipient from an email server, the multi-part e-mail message including an attachment, the method comprising:

accepting the multi-part e-mail message and attachment sent to the e-mail server by a sender;

acquiring recipient's preferences at the e-mail processor from information provided by the recipient;

communicating between the e-mail client and the e-mail processor to obtain e-mail messages;

logging into the e-mail server by the e-mail processor to read the multi-part e-mail message;

retrieving attachment information for the multi-part e-mail message by the e-mail processor from the e-mail server, wherein the attachment information was received by the email server and stored in a storage by the e-mail server or at the e-mail server;

retrieving at least one part of the multi-part e-mail message to be provided to the recipient by the e-mail processor in accordance with the acquired preferences;

preparing a formatted message for sending to the e-mail client from the email processor, said formatted message containing the at least one part of the multi-part e-mail message and a link to content of the attachment, such that the attachment content is not sent to the e-mail client;

downloading attachment content by the e-mail processor from the e-mail server when the e-mail processor has completed the preparation of the formatted message;

sending said formatted message to the e-mail client, wherein selection of the at least one part is not performed by the e-mail processor; and displaying said formatted message at the e-mail client.

2. The method of claim 1, wherein the multi-part e-mail message includes a text-part, such that said preparing a formatted message further comprises separating the multi-part e-mail message into a portion containing said text-part, and wherein said preparing includes adding said portion to said formatted message.

3. The method of claim 1 further comprising: downloading the attachment content from the e-mail processor in a streamed manner for viewing by the recipient.

4. The method of claim 3, further comprising: providing a Web browser for interacting with the recipient; and displaying the attachment by said Web browser, such that said downloading the attachment content is performed according to HTTP.

5. The method of claim 3, wherein the attachment content is decoded before being downloaded.

6. The method of claim 3, wherein said downloading the attachment content includes decoding the attachment content.

7. The method of claim 1, wherein said attachment information is a header for the attachment.

8. A system for selectively downloading a multi-part e-mail message for a recipient, the multi-part e-mail message including an attachment, the system comprising:

(a) an e-mail server for receiving the multi-part e-mail message from an e-mail message sender;

(b) an e-mail processor coupled to the e-mail server and adapted to log-in to the e-mail server on behalf of a recipient's e-mail client and further adapted to retrieve at the e-mail processor previously stored recipient's preferences of at least one part of the multi-part e-mail message, said e-mail processor receiving the at least one part of the multi-part e-mail message from the e-mail server to be provided to the recipient in accordance with the retrieved recipient's preferences, receiving attachment information from the multi-part e-mail message, said attachment is stored in a storage within the e-mail server or in a storage selected by the e-mail server and for preparing a formatted message containing the at least one part and a link to the attachment content, and downloading attachment content by the e-mail processor from the e-mail server when the e-mail processor has completed the preparation of the formatted message; and (c) recipient's e-mail client coupled to said e-mail processor to initiate a log-in to the e-mail server and to receive said formatted message and said user e-mail client adapted to display said formatted message and said link to the recipient, such that the attachment content is not displayed to the recipient until the recipient selects said link.

9. The system of claim 8, wherein the multi-part e-mail message contains a text-part, and said formatted message includes said text-part.

10. The system of claim 8, wherein said e-mail processor downloads and decodes the attachment before the attachment is sent to said e-mail client.

11. A system for selectively downloading a multi-part e-mail message for a recipient, the multi-part e-mail message including an attachment, said attachment, including attachment information and attachment content, is stored in storage within the email server or in a storage selected by the e-mail server, the system comprising:

(a) an e-mail server for receiving the multi-part e-mail message containing at least one of a header or text body;

(b) an e-mail processor coupled to the e-mail server and adapted to log-in to said e-mail server on behalf of a recipient e-mail client and further adapted to retrieve saved recipient's preferences of parts of the multi-part e-mail message, including attachment information, to prepare a formatted message containing the parts as determined by the e-mail proxy according to the recipient's preferences and a link to the attachment content in conjunction with said at least one of header or text body, and to download attachment content from the e-mail server when the e-mail processor has completed the preparation of the formatted message; and (c) the recipient's e-mail client , in communication with said e-mail processor, for directly receiving said formatted message and said recipient's email client adapted to display said formatted message to the recipient, such that the attachment content is displayed to the recipient after the recipient selects said link.

12. A method for selectively downloading a multi-part e-mail message to an e-mail client operated by a recipient from an e-mail server, the multipart e-mail message including an attachment, the method comprising:

receiving the multi-part e-mail message and attachment by said e-mail server;

storing said multi-part e-mail message and attachment in their original form at said e-mail server;

receiving a command at an e-mail proxy from the recipient to view incoming messages stored at the e-mail server, in a reduced form;

retrieving by the e-mail proxy attachment information and a part of the multi-part e-mail message from the e-mail server;

preparing by the e-mail proxy a formatted message for sending to the e-mail client said formatted message containing the part of the multi-part e-mail message and a link to the attachment content, such that the attachment content is not sent to the e-mail client;

sending said formatted message to the e-mail client from the e-mail proxy.

13. The method according to claim 12, further comprising steps of receiving user preferences and determining which part of the multi-part e-mail message shall be contained in the formatted message, in accordance with the received user preferences.

14. The method of claim 12, wherein the multi-part e-mail message includes a text-part, such that said preparing further comprises separating the multi-part e-mail message into a portion containing said text-part, and wherein said preparing includes adding said portion to said formatted message.

15. The method of claim 12, further comprising: downloading the retrieved attachment content to the e-mail client in a streamed manner for viewing by the recipient.

16. The method of claim 15, further comprising: providing a Web browser for interacting with the recipient; and displaying the attachment by said Web browser, such that said downloading the retrieved attachment content is performed according to HTTP.

* * * * *